(12) United States Patent
Kobayashi et al.

(10) Patent No.: US 11,563,230 B2
(45) Date of Patent: Jan. 24, 2023

(54) FUEL CELL SINGLE CELL

(71) Applicant: TOYOTA JIDOSHA KABUSHIKI KAISHA, Toyota (JP)

(72) Inventors: Masaya Kobayashi, Toyota (JP); Nobuaki Nonoyama, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 258 days.

(21) Appl. No.: 16/704,270

(22) Filed: Dec. 5, 2019

(65) Prior Publication Data

US 2020/0203752 A1 Jun. 25, 2020

(30) Foreign Application Priority Data

Dec. 21, 2018 (JP) .............................. JP2018-239848

(51) Int. Cl.
*H01M 8/2483* (2016.01)
*H01M 8/026* (2016.01)
(Continued)

(52) U.S. Cl.
CPC ....... *H01M 8/2483* (2016.02); *H01M 8/0202* (2013.01); *H01M 8/026* (2013.01); *H01M 8/0258* (2013.01); *H01M 8/0273* (2013.01)

(58) Field of Classification Search
None
See application file for complete search history.

(56) References Cited

U.S. PATENT DOCUMENTS

2002/0081477 A1* 6/2002 McLean ................ H01M 8/026
429/492
2003/0186106 A1* 10/2003 Frank .................. H01M 8/0297
429/435
(Continued)

FOREIGN PATENT DOCUMENTS

JP 2013-222698 A 10/2013
JP 2013222698 A * 10/2013
(Continued)

OTHER PUBLICATIONS

Machine English Translation of JP-2013222698-A from Espacenet originally published to Chiba Oct. 28, 2013 (Year: 2013).*

*Primary Examiner* — Ula C Ruddock
*Assistant Examiner* — Mary Grace Byram
(74) *Attorney, Agent, or Firm* — Dickinson Wright, PLLC (57) ABSTRACT

A fuel cell single cell includes a pair of separators each having manifold holes, a frame disposed between the separators, a power generating unit disposed in an opening of the frame, and a plurality of gas flow channels configured to connect the power generating unit with the manifold holes. Each of the gas flow channels has a distal channel portion defined by a frame groove provided in the frame and configured to communicate with the manifold holes, and a proximal channel portion defined by a separator groove provided in the corresponding separator and configured to communicate with the power generating unit. Each of the gas flow channels is configured to be independent of adjacent other gas flow channels, at least over a range from a distal end of the distal channel portion, which communicates with the manifold holes, to a point in the proximal channel portion.

3 Claims, 4 Drawing Sheets

(51) Int. Cl.
*H01M 8/0273* (2016.01)
*H01M 8/0258* (2016.01)
*H01M 8/0202* (2016.01)

(56) References Cited

U.S. PATENT DOCUMENTS

2005/0277013 A1* 12/2005 Yamaga .............. H01M 8/0273
429/457
2018/0145352 A1  5/2018 Kondo et al.
2018/0301727 A1 10/2018 Sato et al.

FOREIGN PATENT DOCUMENTS

JP 2018085207 A 5/2018
JP 2018181661 A 11/2018

* cited by examiner

FUEL CELL SINGLE CELL

INCORPORATION BY REFERENCE

The disclosure of Japanese Patent Application No. 2018-239848 filed on Dec. 21, 2018 including the specification, drawings and abstract is incorporated herein by reference in its entirety.

BACKGROUND

1. Technical Field

The disclosure relates to a fuel cell single cell.

2. Description of Related Art

A known example of a fuel cell that consists of a plurality of unit cells stacked together is described in Japanese Unexamined Patent Application Publication No. 2018-085207 (JP 2018-085207 A). The fuel cell described in JP 2018-085207 A was developed for the purpose of restricting or preventing flow of water into power generation cells. To achieve the purpose, the fuel cell described in JP 2018-085207A is constructed as described below (see JP 2018-085207 A, claim 1, etc.).

The fuel cell has a plurality of power generation cells stacked together, an end cell provided at at least one of opposite ends of the power generation cells as viewed in their stacking direction, and introduction passages that extend in the stacking direction of the power generation cells. Each of the power generation cells has a first plate having a membrane-electrode assembly, a pair of first separators between which the first plate is sandwiched, and first flow channels formed between the first separators and the first plate, such that gas used for power generation passes through the first flow channels.

The known fuel cell adopts at least one of "first structure" and "second structure" for the end cell. With this arrangement, water that was generated outside and entered the interior of the fuel cell can be drawn into the end cell, by use of flow of gas for power generation from the introduction passage into the end cell, and flow of the water into the power generation cells can be restricted or prevented (see JP 2018-085207 A, paragraph [0010], etc.).

In the known fuel cell, each power generation cell is constructed such that a frame plate in the form of a flat plate is sandwiched between an upstream-side first separator and a downstream-side first separator (see JP 2018-085207 A, paragraph [0030], FIG. 1, etc.). A recessed portion is formed in a central portion of the upstream-side first separator as viewed in the longitudinal direction, and a plurality of channel protrusions are formed on a bottom of the recessed portion, so that hydrogen gas flow channels in the form of a plurality of parallel channels are defined by the channel protrusions (see JP 2018-085207 A, paragraphs [0032] to [0034], FIG. 2, etc.)

Also, the frame plate has through-holes that form parts of respective fluid passages (see JP 2018-85207 A, paragraph [0035], FIG. 3, etc.). In the interior of the power generation cell, the frame plate and the upstream-side first separator closely adhere to each other at peripheries of the through-holes, and each fluid passage is sealed against the outside, between opposed surfaces of the frame plate and the upstream-side first separator.

Further, the frame plate is formed with a plurality of long holes that extends from a position adjacent to one of the through-holes, to a position adjacent to the recessed portion (see JP 2018-085207 A, paragraph [0036], FIG. 3, etc.). The long holes provide clearances that communicate a gas introduction passage (fluid passage) with the interior of the recessed portion, between the upstream-side first separator and the downstream-side first separator. Each of the long holes forms a part of the gas flow channel.

SUMMARY

In the know fuel cell, a plurality of parallel passages provided in the recessed portion of the first separator of the power generation cell has a plurality of introduction flow channels connected to the gas introduction passage, and a plurality of distribution flow channels that branch off from the introduction flow channels (see JP 2018-085207 A, paragraph [0034]). Portions of the introduction flow channels closer to the gas introduction passage are provided by the long holes provided in the frame plate (see JP 2018-085207 A, paragraph [0036]).

On the other hand, portions of the introduction flow channels opposite to the gas introduction passage are defined by the channel protrusions provided in the recessed portion of the first separator, and have flow channels that extend so as to traverse all of the introduction flow channels, and communicate all of the introduction flow channels with each other. With this arrangement, a difference in the pressure of gas between the upstream side and downstream side of each introduction flow channel is reduced, and the drainage performance of the introduction flow channel may deteriorate, thus leaving some room of improvement.

This disclosure provides a fuel cell single cell that is able to improve the drainage performance of parts of flow channels of gas used for power generation, as compared with that of the known fuel cell.

According to one aspect of this disclosure, a fuel cell single cell is provided. The fuel cell single cell includes a pair of separators each having manifold holes, a frame disposed between the separators, a power generating unit disposed in an opening of the frame, and a plurality of gas flow channels configured to connect the power generating unit with the manifold holes. Each of the gas flow channels has a distal channel portion defined by a frame groove provided in the frame and configured to communicate with the manifold holes, and a proximal channel portion defined by a separator groove provided in a corresponding one of the separators and configured to communicate with the power generating unit. Each of the gas flow channels is configured to be independent of adjacent other gas flow channels, at least over a range from a distal end of the distal channel portion, which communicates with the manifold holes, to a point in the proximal channel portion.

According to the above aspect of the disclosure, a pressure difference between the upstream portion and downstream portion of the gas flow channel between the manifold holes as a part of flow channel of gas used for power generation and the power generating unit is increased to be larger than that of the known fuel cell. Thus, the fuel cell single cell capable of improving the drainage performance of the gas flow channel, as compared with that of the known fuel cell, can be provided.

In the fuel cell single cell of the above aspect, the proximal channel portion may include a connecting portion connected to the distal channel portion, a first proximal channel portion connected to the connecting portion and configured to extend toward the power generating unit, and a second proximal channel portion connected to the connecting portion and configured to extend toward the power generating unit.

In the fuel cell single cell of the above aspect, each of the gas flow channels may be configured to be independent, over a range from a distal end of the gas flow channel which communicates with the manifold holes, to a proximal end of the gas flow channel which communicates with the power generating unit.

In the fuel cell single cell of the above aspect, at least two adjacent ones of the gas flow channels may be configured to be connected via a common channel portion in the proximal channel portion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A fuel cell single cell according to one embodiment of this disclosure will be described with reference to the drawings.

Figure 1:
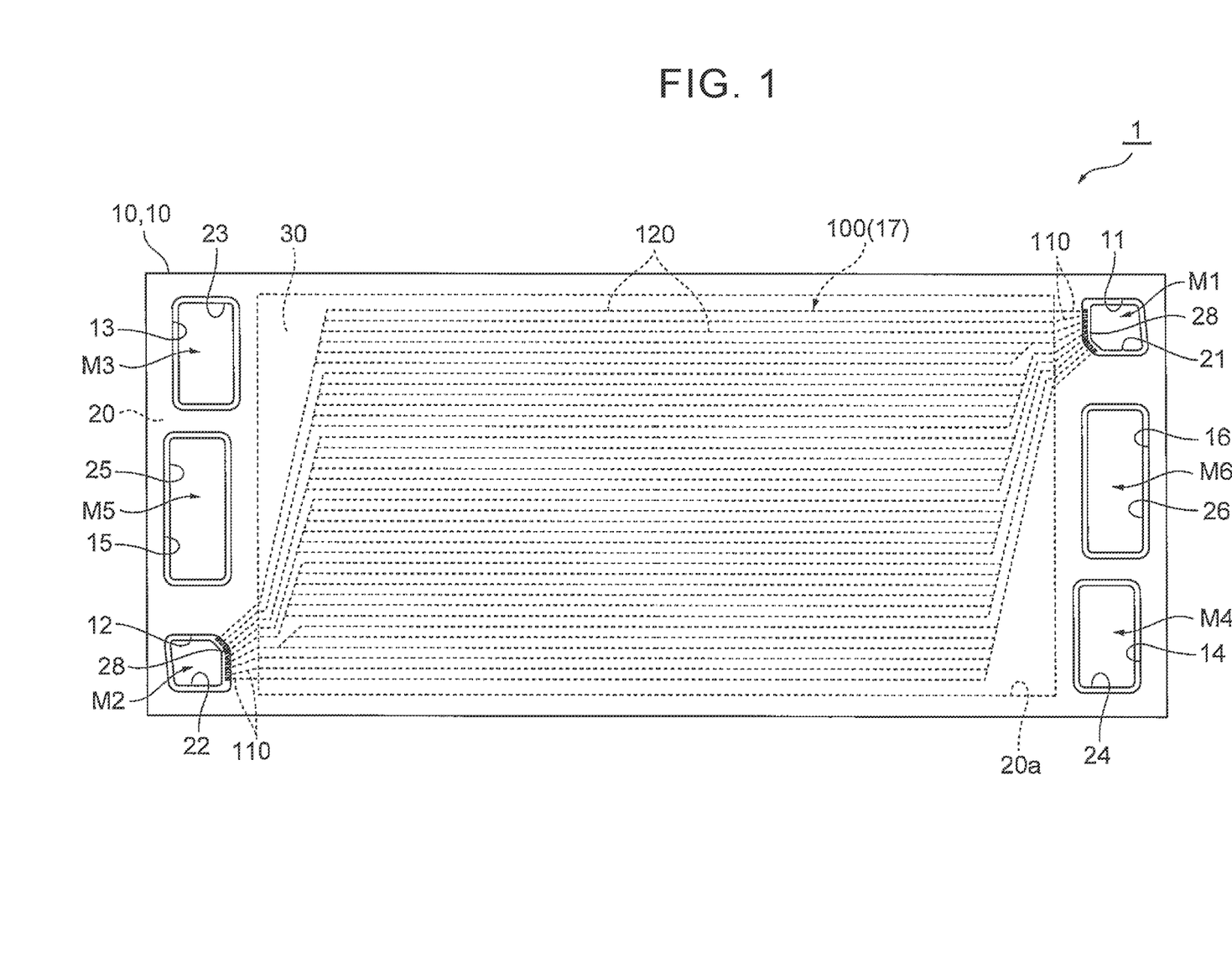
FIG. 1 is a plan view of a fuel cell single cell according to one embodiment of the disclosure.

FIG. 1 is a plan view of a fuel cell single cell 1 according to one embodiment of this disclosure. The fuel cell single cell 1 of this embodiment includes a pair of separators 10, 10, a frame 20 disposed between the separators 10, 10, and a power generating unit 30 disposed in an opening 20a of the frame 20, for example.

Each of the separators 10, 10 has a plurality of manifold holes 11 to 16 that form manifolds M1 to M6, respectively. The separator 10 is made of a material having gas barrier properties and electrical conductivity. For example, the separator 10 is a gas-impermeable carbon member formed of dense carbon by compressing carbon particles, or a metallic member formed of stainless steel or titanium by press forming.

The frame 20 is formed of an insulating material having electrical insulation properties, for example. The frame 20 is formed by punching a film-shaped member that has flexibility and permits thermal welding, into the shape of a frame having the opening 20a in its central portion, in which the power generating unit 30 is located. The frame 20 has a plurality of manifold openings 21 to 26 that form the manifolds M1 to M6, respectively, in its outer edge portion. For example, the frame 20 is welded to the separators 10, 10, and functions as a joining material that joins the separators 10, 10.

The power generating unit 30 is in the form of a membrane electrode and gas diffusion layer assembly (MEGA), and generates electric power by reacting first gas and second gas for power generation. The first gas is fuel gas containing hydrogen, for example, and the second gas is oxidant gas, such as air containing oxygen, for example.

The separators 10, 10, frame 20, and power generating unit 30 form first gas channels 100 and second gas channels (not shown) as flow channels of gases used for power generation. As shown in FIG. 1, the first gas channels 100 are provided on a surface side of the fuel cell single cell 1, and the second gas channels are provided on a back side of the fuel cell single cell 1, for example.

The first gas channels 100 have a plurality of outer-edge channels 110 (gas flow channels) and a plurality of power-generating-unit channels 120. The outer-edge channels 110 are provided in an outer edge portion of the fuel cell single cell 1, and connect the manifolds M1, M2 with the power generating unit 30. The power-generating-unit channels 120 are exposed to the power generating unit 30, and extend in the longitudinal direction of the separator 10 having a rectangular shape. Although not illustrated in the drawings, the second gas channels have a plurality of outer-edge channels and a plurality of power-generating-unit channels, like the first gas channels 100. The outer-edge channels are provided in the outer edge portion of the fuel cell single cell 1, and connect the manifolds M3, M4 with the power generating unit 30, and the power-generating-unit channels are exposed to the power generating unit 30 and extend in the longitudinal direction of the rectangular separator 10.

One ends of the power-generating-unit channels 120 of the first gas channels 100 communicate via the outer-edge channels 110 with the first manifold M1 through which the first gas for power generation is supplied. The other ends of the power-generating-unit channels 120 of the first gas channels 100 communicate via the outer-edge channels 110 with the second manifold M2 through which the first gas for power generation, which was not used for reaction in the power generating unit 30, is discharged.

Although not illustrated in the drawings, one ends of the power-generating-unit channels of the second gas channels on the back side of the fuel cell single cell 1 communicate via the outer-edge channels with the third manifold M3 through which the second gas for power generation is supplied. The other ends of the power-generating-unit channels of the second gas channels communicate via the outer-edge channels with the fourth manifold M4 through which the second gas for power generation, which was not used for reaction in the power generating unit 30, is discharged.

The arrangement of the second gas channels on the back side of the fuel cell single cell 1 is substantially identical with that of the first gas channels 100 on the surface side of the fuel cell single cell 1 shown in FIG. 1. Thus, the arrangement of the first gas channels 100 will be described in detail, so that the arrangement of the second gas channels will be understood as well, and description and illustration of the second gas channels will be omitted.

Figure 2:
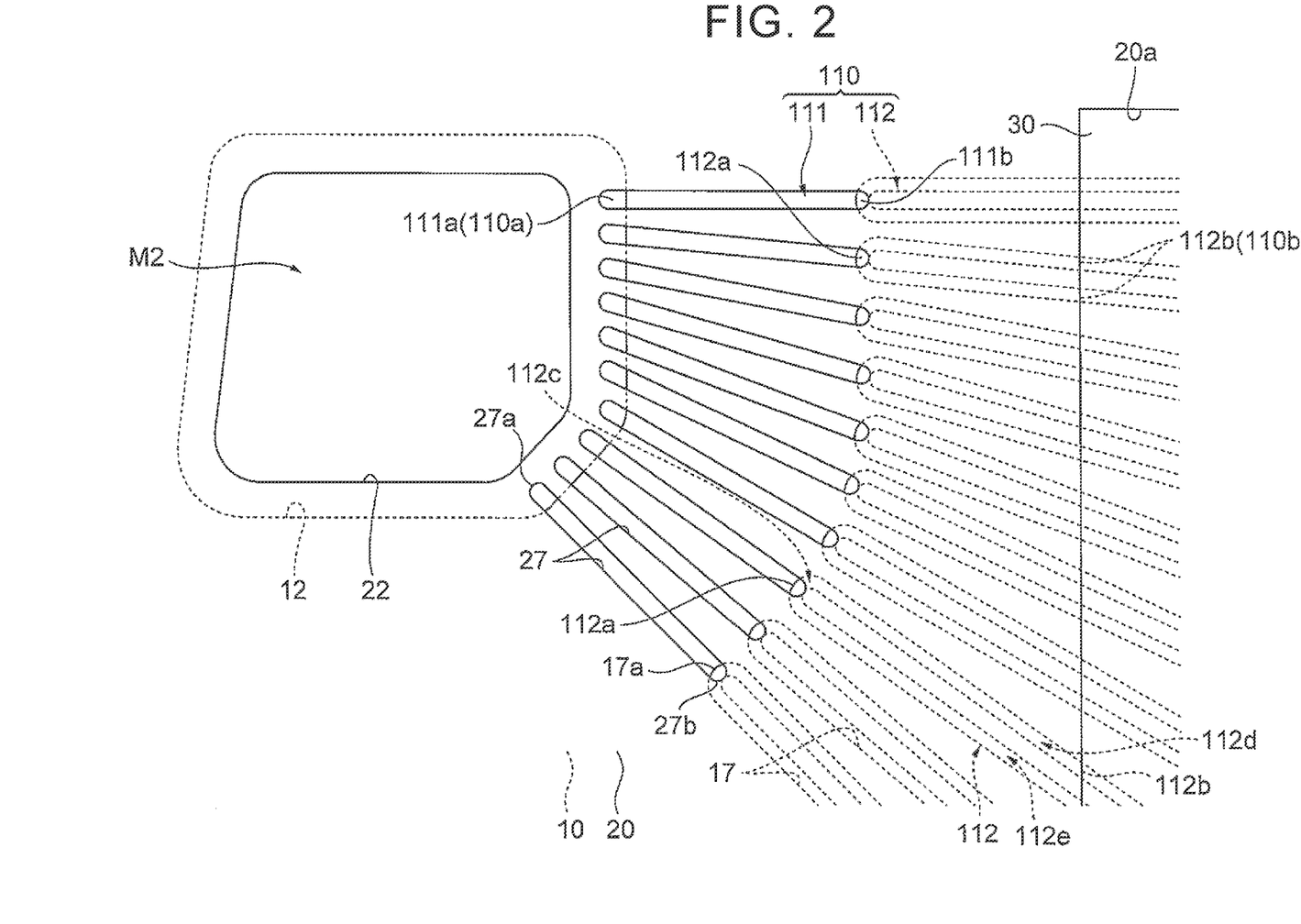
FIG. 2 is an enlarged view of the vicinity of a manifold of the fuel cell single cell shown in FIG. 1.

FIG. 2 is an enlarged view of the vicinity of the manifold M2 of the fuel cell single cell 1 shown in FIG. 1. FIG. 2 shows the frame 20 as viewed from the back side, when the separator 10 on the back side, as one of the separators 10, 10 on the surface side and back side of the fuel cell single cell 1 shown in FIG. 1, is removed. The fuel cell single cell 1 of this embodiment is mainly characterized by the following configuration, though its details will be described later.

The fuel cell single cell 1 includes the above-mentioned pair of separators 10, 10 each having the manifold holes 11 to 16, frame 20 disposed between the separators 10, 10, and power generating unit 30 disposed in the opening 20a of the frame 20. The fuel cell single cell 1 also includes the outer-edge channels 110 as the gas flow channels that connect the power generating unit 30 with the manifold holes 11 to 14. Each of the outer-edge channels 110 has a distal channel portion 111 that is defined by a frame groove 27 provided in the frame 20, and communicates with a corresponding one of the manifold holes 11 to 14, and a proximal channel portion 112 that is defined by a separator groove 17 provided in the separator 10, and communicates with the power generating unit 30. At least a portion of each of the outer-edge channels 110, which extends from a distal end 111a of the distal channel portion 111 communicating with the manifold hole 11 to 14, to a certain point in the proximal channel portion 112, is independent of other outer-edge channels 110 located adjacent to the outer-edge channel 110 in question. In this connection, "independent" means that each of the outer-edge channels 110 is not communicated with adjacent other outer-edge channels 110. In this specification, "distal" means being located closer to the outer edge than the center of the fuel cell single cell 1, and "proximal" means being located closer to the center than the outer edge of the fuel cell single cell 1.

The configuration of a characterizing portion of the fuel cell single cell 1 of this embodiment will be described in detail.

As shown in FIG. 1 and FIG. 2, the frame 20 has a plurality of slit-shaped frame grooves 27, between the opening 20a of its central portion and each of the manifold openings 21 to 24 of its peripheral portion. The frame grooves 27 are slit-shaped through-holes or grooves formed in the outer edge portion of the frame 20, and extend radially from the manifold opening 21 to 24 in the outer edge portion of the frame 20, toward the opening 20a in its central portion. The distal channel portions 111 of the outer-edge channels 110 are defined by the separators 10, 10 and the frame grooves 27 of the frame 20, for example.

The separator 10 on the surface side of the fuel cell single cell 1 shown in FIG. 1 and the separator 10 on the back side have a plurality of separator grooves 17 that define the first gas channels 100 and the second gas channels, respectively, on their inside surfaces opposed to the frame 20 and the power generating unit 30. The separator grooves 17 are concave grooves that are recessed from the inside surfaces of the separators 10, 10 toward the outside. In other words, the separator grooves 17 are defined by protruding portions that protrude from the inside surfaces of the separators 10, 10 toward the frame 20 and the power generating unit 30.

For example, the separator grooves 17 can be formed in concave shape by pressing the separators 10, in the inside surfaces of the separators 10, 10 opposed to the frame 20 and the power generating unit 30. The separators 10, 10 may also be formed with protruding portions, on its surfaces opposite to the separator grooves 17, namely, on the outside surfaces of the opposed separators 10, 10.

In the first gas channels 100 of the fuel cell single cell 1 shown in FIG. 1, the proximal channel portions 112 of the outer-edge channels 110 shown in FIG. 2 are defined by the separator grooves 17 of the separator 10 and the frame 20, for example. The proximal channel portions 112 extend from proximal ends 111b of the distal channel portions 111 closer to the power generating unit 30, to the inside of the opening 20a of the frame 20, and connect the distal channel portions 111 to the power generating unit 30.

Also, each of the outer-edge channels 110 as the gas flow channels that connect the power generating unit 30 with the manifold holes 11, 12, as a part of the first gas channel 100, is independent, over a range from the distal end 110a that communicates with the manifold hole 11, 12, to the proximal end 110b that communicates with the power generating unit 30. Each of the outer-edge channels 110 consists of one distal channel portion 111, and one proximal channel portion 112.

More specifically, in each of the outer-edge channels 110, the proximal end 111b of one distal channel portion 111 closer to the power generating unit 30 is connected to the distal end 112a of one proximal channel portion 112 closer to the manifold hole 11, 12. Namely, the proximal ends 27b of the frame grooves 27 provided in the frame 20 closer to the power generating unit 30 are connected to the distal ends 17a of the separator grooves 17 provided in the separator 10, which ends are closer to the manifold holes 11 to 14. More specifically, the proximal ends 27b of the frame grooves 27 are open to the openings of the distal ends 17a of the separator grooves 17.

In this manner, the proximal ends 111b of the distal channel portions 111 are connected to the distal ends 112a of the proximal channel portions 112. As a result, the distal ends 111a of the distal channel portions 111 closer to the manifold holes 11, 12 communicate with the proximal ends 112b of the proximal channel portions 112 closer to the power generating unit 30. Then, the distal ends 110a of the outer-edge channels 110 communicating with the manifold holes 11, 12 are connected to the proximal ends 110b of the outer-edge channels 110 communicating with the power generating unit 30, via the distal channel portions 111 and the proximal channel portions 112.

More specifically, the distal ends 111a of the distal channel portions 111 communicate with the manifold holes 11, 12 of the separator 10. Namely, in the plan views shown in FIG. 1 and FIG. 2, the manifold opening 21 to 24 of the frame 20 are smaller than the manifold holes 11 to 14 of the separators 10, and are located on the inner side of the manifold holes 11 to 14 of the separators 10. Also, the distal ends 27a of the frame grooves 27 closer to the manifold holes 11 to 14 are located on the inner side of the manifold holes 11 to 14 of the separators 10, and are open to the manifold holes 11 to 14. Thus, the distal ends 111a of the distal channel portions 111 defined by the frame grooves 27 communicate with the manifold holes 11 to 14.

Also, the proximal ends 112b of the proximal channel portions 112 communicate with the power generating unit 30 located inside the opening 20a of the frame 20. More specifically, in the plan views shown in FIG. 1 and FIG. 2, the separator grooves 17 provided in the separator 10 extend from the distal ends 17a to the power generating unit 30 located inside the opening 20a of the frame 20, and are open to the power generating unit 30. Thus, the proximal ends 112b of the proximal channel portions 112 defined by the separator grooves 17 communicate with the power generating unit 30.

Further, each of the distal channel portions 111 is separated from other distal channel portions 111 located adjacent to that portion 111, and is not communicated with but is independent of the adjacent other distal channel portions 111. Namely, the frame grooves 27 of the frame 20, which define the distal channel portions 111, do not communicate with each other, and each frame groove 27 is spaced apart from the other frame grooves 27. Also, each of the proximal channel portions 112 is separated from other proximal channel portions 112 located adjacent to that portion 112, and is not communicated with but is independent of the adjacent other proximal channel portions 112. Namely, the separator grooves 17 of the separator 10, which define the proximal channel portions 112, do not communicate with each other, and each of the separator grooves 17 is spaced apart from the other separator grooves 17.

The distal end 111a of each distal channel portion 111 is the distal end 110a of the corresponding outer-edge channel 110, and the proximal end 112b of each proximal channel portion 112 is the proximal end 110b of the corresponding outer-edge channel 110. Accordingly, each of the outer-edge channels 110 as the gas flow channels that connect the power generating unit 30 with the manifold holes 11 to 14 is independent of adjacent other outer-edge channels 110, over the range from the distal end 110a that communicates with one of the manifold holes 11 to 14, to the proximal end 110b that communicates with the power generating unit 30.

In the example shown in FIG. 2, each of the proximal channel portions 112 includes a connecting portion 112c, a first proximal channel portion 112d, and a second proximal channel portion 112e, which are arranged in a direction from the distal end 112a closer to the manifold hole 11 to 14, to the proximal end 112b closer to the power generating unit 30. The connecting portion 112c is connected to the corresponding distal channel portion 111. The first proximal channel portion 112d and second proximal channel portion 112e are connected to the connecting portion 112c, and extend toward the power generating unit 30.

The connecting portion 112c of the proximal channel portion 112 is a flow channel that is curved in an arc, semicircular shape, or curved shape, as seen in the plan view of FIG. 2, for example. The first proximal channel portion 112d and the second proximal channel portion 112e extend along straight lines, or along gently curved lines including straight portions, between the connecting portion 112c and the power generating unit 30. A circle of curvature of the outer peripheral edge of the connecting portion 112c has a diameter that is larger than the width of the proximal end 111b of the distal channel portion 111, and the connecting portion 112c is provided at a position overlapping the proximal end 111b of the distal channel portion 111, and is connected to the proximal end 111b of the distal channel portion 111.

The connecting portion 112c causes gas used for power generation, which is introduced from the manifold hole 11, 13 toward the power generating unit 30 via the distal channel portion 111, to diverge into the first proximal channel portion 112d and the second proximal channel portion 112e. Also, the connecting portion 112c causes gas used for power generation, which is discharged from the power generating unit 30 toward the manifold hole 12, 14 via the first proximal channel portion 112d and second proximal channel portion 112e, to be merged and fed into the distal channel portion 111.

In the following, the operation of the fuel cell single cell 1 according to this embodiment will be described based on comparisons with the known fuel cell single cell.

The fuel cell single cell 1 of this embodiment constitutes a fuel cell stack that consists of a plurality of fuel cell single cells 1 stacked together. During power generation of the fuel cell stack, fuel gas is supplied to the individual fuel cell single cells 1, via the first manifold M1, and oxidant gas is supplied to the individual fuel cell single cells 1, via the third manifold M3.

The fuel gas supplied to the fuel cell single cells 1 via the first manifold M1 flows into one ends of the power-generating-unit channels 120, via the outer-edge channels 110 of the first gas channels 100. More specifically, the fuel gas supplied to the first manifold M1 flows into the distal ends 111a of the distal channel portions 111 of the outer-edge channels 110 that communicate with the manifold holes 11 of the separators 10 which form the manifold M1.

The fuel gas flowing into the distal ends 111a of the distal channel portions 111 flows through the distal channel portions 111 toward the opposite proximal ends 111b, and flows into the distal ends 112a of the proximal channel portions 112. The fuel gas flowing into the distal ends 112a of the proximal channel portions 112 flows through the proximal channel portions 112 toward the opposite proximal ends 112b, and flows into one ends of the power-generating-unit channels 120 exposed to the power generating unit 30.

As described above, in the known fuel cell, a plurality of parallel channels provided in the recessed portion of the first separator of the power generation cell has a plurality of introduction flow channels connected to the gas introduction passage, and a plurality of distribution channels that branches off from the introduction flow channels. A plurality of long holes provided in the frame plate forms portions of the introduction flow channels closer to the gas introduction passage. Also, in the known fuel cell, portions of the introduction flow channels opposite to the gas introduction passage have flow channels that are defined by a plurality of channel protrusions provided in the recessed portion of the first separator, and extend so as to traverse all of the introduction flow channels, and communicate with all of the introduction flow channels. With this arrangement, a pressure difference of gas between the upstream side and downstream side of each introduction flow channel is reduced, and the drainage performance of the introduction flow channels may be deteriorated.

On the other hand, the fuel cell single cell 1 of this embodiment includes the above-mentioned pair of separators 10, 10 each having the manifold holes 11 to 16, frame 20 disposed between the separators 10, 10, power generating unit 30 disposed in the opening 20a of the frame 20, and outer-edge channels 110 as gas flow channels that connect the power generating unit 30 with the manifold holes 11 to 14. Then, each of the outer-edge channels 110 has the distal channel portion 111 that is defined by the frame groove 27 provided in the frame 20 and communicates with the corresponding manifold hole 11 to 14, and the proximal channel portion 112 that is defined by the separator groove 17 provided in the separator 10 and communicates with the power generating unit 30. Then, each of the outer-edge channels 110 is independent of other outer-edge channels 110 located adjacent to that channel 110, at least over the range from the distal end 111a of the distal channel portion 111 communicating with the manifold hole 11 to 14, to a certain point in the proximal channel portion 112.

With this arrangement, a pressure difference of the fuel gas between the distal end 110a and proximal end 110b of the outer-edge channel 110 can be made larger than a pressure difference of the fuel gas between the upstream end and downstream end of the introduction flow channel of the power generation cell in the known fuel cell. More specifically, where "1" denotes the length from the distal end 110a to proximal end 110b of the outer-edge channel 110, "d" denotes the diameter of the outer-edge channel 110, "p" denotes the density of gas flowing in the outer-edge channel 110, "u" denotes the average flow rate of the gas, and "λ" denotes a pressure drop coefficient, a pressure difference "ΔP" of gas flowing between the distal end 110a and proximal end 110b of the outer-edge channel 110 is expressed by the following equation (1).

$$\Delta P = \lambda \times (1/d) \times (\rho \times u^2)/2 \qquad (1)$$

As described above, in the fuel cell single cell 1 of this embodiment, each of the outer-edge channels 110 is independent of the other outer-edge channels 110 located adjacent to that channel 110, at least over the range from the distal end 111a of the distal channel portion 111 which communicates with the manifold hole 11 to 14, to a certain point of the proximal channel portion 112. On the other hand, in the power generation cell of the known fuel cell, the introduction flow channels have channels that extend so as to traverse all of the introduction flow channels, and communicate all of the introduction flow channels with each other.

Thus, according to this embodiment, the length "l" of the outer-edge channel 110 can be made larger than the length "l" of the introduction flow channel of the known power generation cell. Accordingly, where parameters other than the length "l" in the above equation (1) are equal, between the outer-edge channel 110 of the fuel cell single cell 1 of this embodiment and the introduction flow channel of the known power generation cell, the pressure difference ΔP of gas between the distal end 110a and proximal end 110b of the outer-edge channel 110 can be made larger than that of the known power generation cell.

As a result, according to the fuel cell single cell 1 of this embodiment, the pressure difference ΔP of the outer-edge channel 110, which is larger than that of the know fuel cell, makes it possible to promote discharge of liquid, such as water, that entered each outer-edge channel 110 along with the gas for power generation, for example. Accordingly, the fuel cell single cell 1 of this embodiment is able to improve drainage performance of the outer-edge channels 110 as parts of flow channels of gas for power generation, as compared with that of the known fuel cell. Thus, when the ambient temperature reaches a level below zero, liquid, such as water, can be prevented from freezing in the outer-edge channels 110, and the outer-edge channels 110 can be prevented from being blocked.

Also, in the fuel cell single cell 1 of this embodiment, each of the outer-edge channels 110 as the gas flow channels that connect the power generating unit 30 with the manifold holes 11 to 14 is independent of the other outer-edge channels 110, over the range from the distal end 110a that communicates with the corresponding manifold hole 11 to 14, to the proximal end 110b that communicates with the power generating unit 30. Thus, the length "l" of the outer-edge channel 110 in the above equation (1) can be made larger, and the pressure difference ΔP in the outer-edge channel 110 can be increased, so that the drainage performance of the outer-edge channel 110 can be further improved.

Also, in the fuel cell single cell 1 of this embodiment, the proximal channel portion 112 includes the connecting portion 112c connected to the distal channel portion 111, first proximal channel portion 112d that is connected to the connecting portion 112c and extends toward the power generating unit 30, and the second proximal channel portion 112e that is similarly connected to the connecting portion 112c and extends toward the power generating unit 30. With this arrangement, the dimension of the connecting portion 112c as measured in the width direction of the distal channel portion 111 can be made larger than the width of the distal channel portion 111. It is thus possible to allow a position error between the proximal end 111b of the distal channel portion 111 and the distal end 112a of the proximal channel portion 112, which makes it easy to position the distal channel portion 111 and the proximal channel portion 112 relative to each other.

The fuel gas flowing through the outer-edge channels 110 into one ends of the power-generating-unit channels 120 exposed to the power generating unit 30 is used for reaction with the oxidant gas in the power generating unit 30, in the course of flowing through the power-generating-unit channels 120 toward the other ends. The oxidant gas supplied to the third manifold M3 flows into one ends of the power-generating-unit channels via the outer-edge channels of the second gas channels on the back side (not shown), and is used for reaction with the fuel gas in the power generating unit 30, in the course of flowing through the power-generating-unit channels toward the other ends.

Here, the fuel cell single cell 1 of this embodiment includes a plurality of outer-edge channels similar to the outer-edge channels 110 of the first gas channels 100, in the second gas channels, as a plurality of gas flow channels that connects the manifold holes 13 of the separators 10 which form the third manifold M3, with the power generating unit 30. Thus, like the outer-edge channels 110 of the first gas channels 100 as described above, the drainage performance of the outer-edge channels of the second gas channels which connect the manifold holes 13 with the power generating unit 30 can be improved as compared with that of the known fuel cell.

The fuel gas that has reached the other ends of the power-generating-unit channels 120 of the first gas channels 100, without being used for reaction with the oxidant gas in the power generating unit 30, flows into the outer-edge channels 110 that connect the power generating unit 30 with the manifold holes 12 of the separators 10 which form the manifold M2. The fuel gas flowing into the outer-edge channels 110 flows through the proximal channel portions 112 and the distal channel portions 111, from the proximal ends 110b of the outer-edge channels 110 toward the distal ends 110a, and is discharged into the manifold holes 12.

Here, the fuel cell single cell 1 of this embodiment includes a plurality of outer-edge channels 110 constructed as described above, as a plurality of gas flow channels that connects the power generating unit 30 with the manifold holes 12. It is thus possible to improve the drainage performance of the outer-edge channels 110 of the first gas channels 100 that connect the power generating unit 30 with the manifold holes 12, as compared with that of the known fuel cell, and smoothly discharge liquid, such as water, which entered the outer-edge channels 110, into the manifold holes 12.

The oxidant gas that has reached the other ends of the power-generating-unit channels of the second gas channels, without being used for reaction with the fuel gas in the power generating unit 30, flows into the outer-edge channels that connect the power generating unit 30 with the manifold holes 14 of the separators which form the manifold M4. The fuel gas flowing into the outer-edge channels flows through the proximal channel portions and the distal channel portions, from the proximal ends of the outer-edge channels toward the distal ends, and is discharged into the manifold holes 14.

Here, the fuel cell single cell 1 of this embodiment includes the outer-edge channels having the above configuration, as the flow channels that connect the power generating unit 30 with the manifold holes 14. Thus, as described above, it is possible to improve the drainage performance of the outer-edge channels of the second gas channels which connect the power generating unit 30 with the manifold holes 14, as compared with that of the known fuel cell, and smoothly discharge liquid, such as water, which entered the outer-edge channels, into the manifold holes 14.

Figure 3:
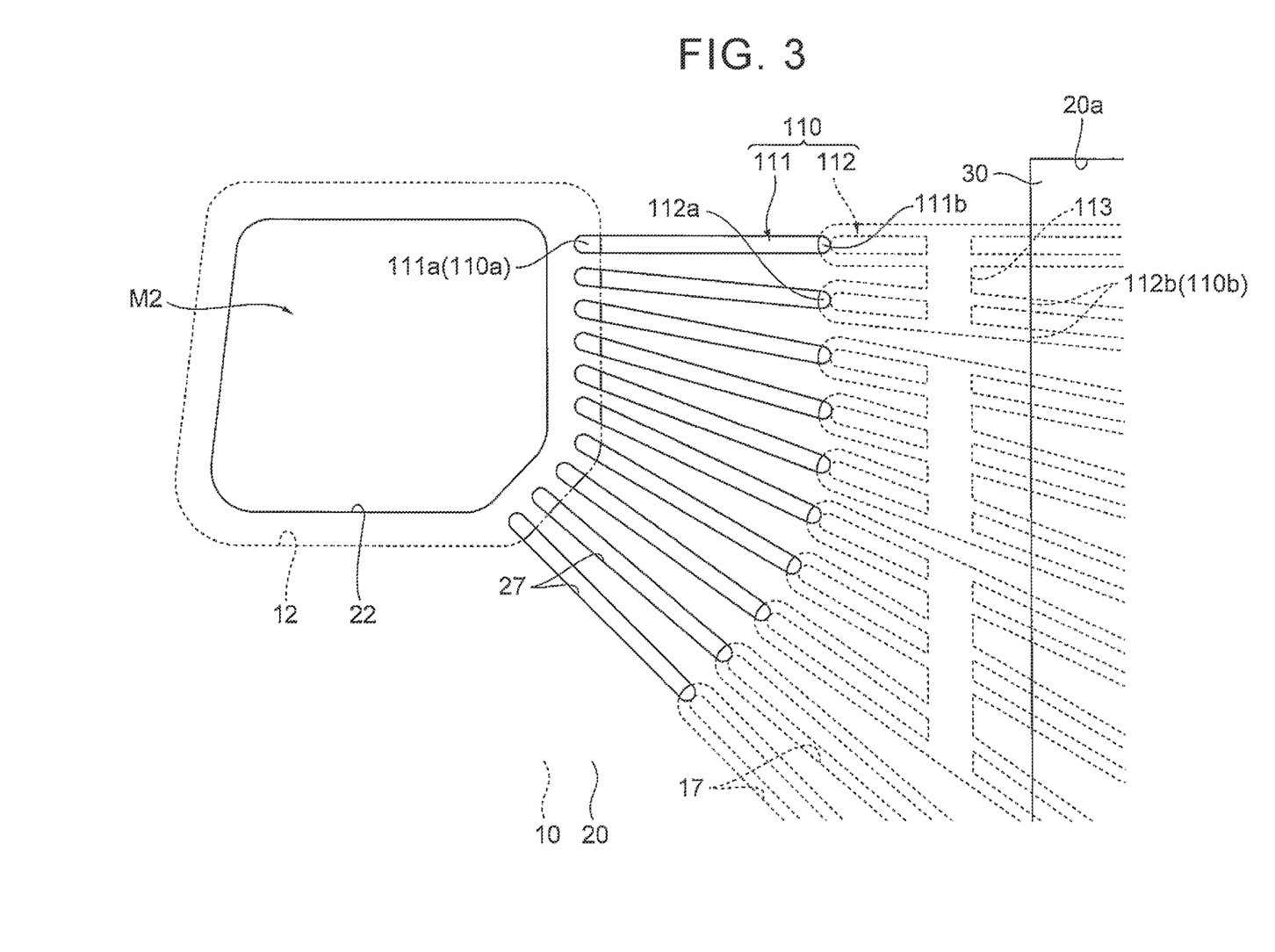
FIG. 3 is an enlarged view of the vicinity of the manifold according to a first modified example of the fuel cell single cell shown in FIG. 1.
Figure 4:
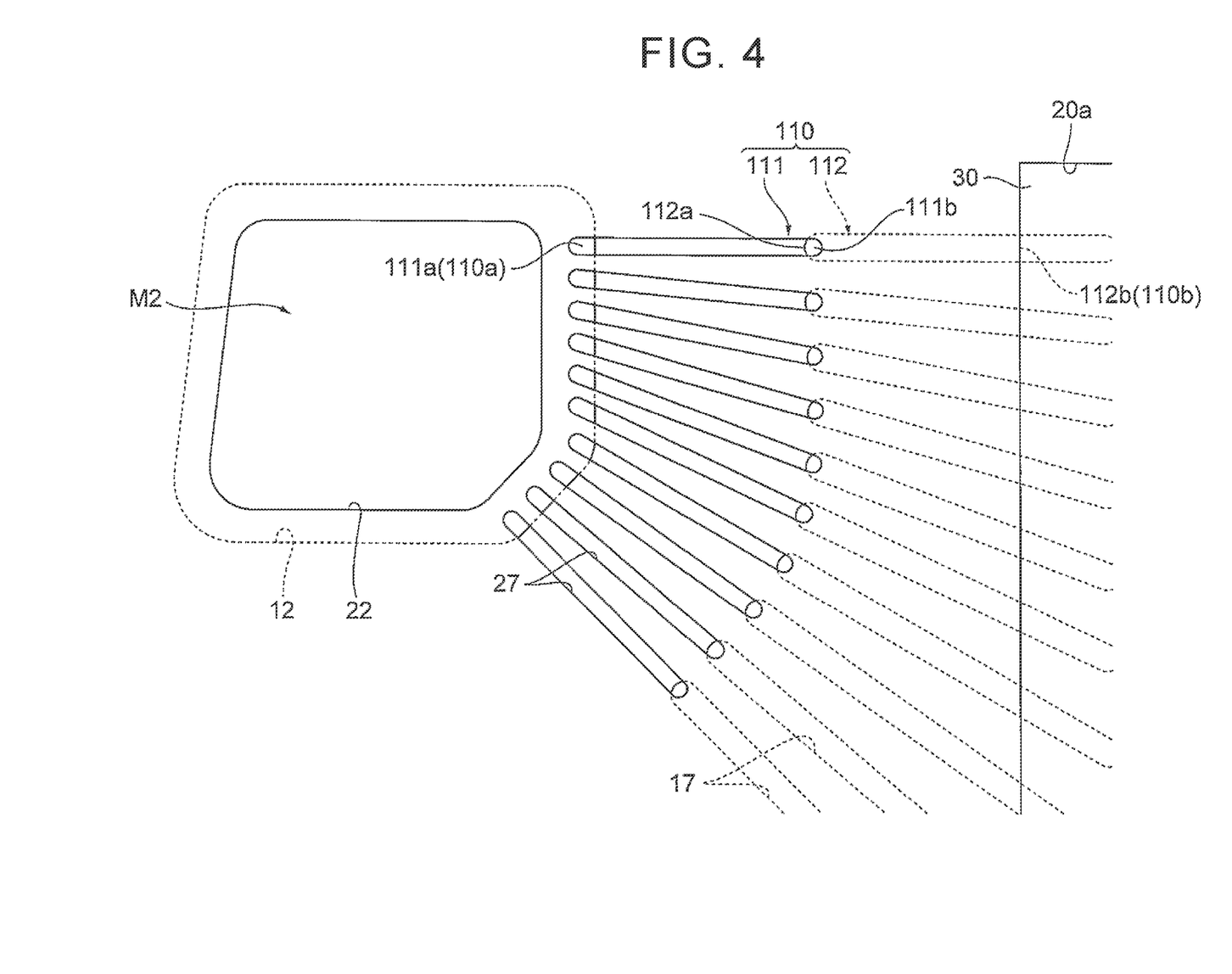
FIG. 4 is an enlarged view of the vicinity of the manifold according to a second modified example of the fuel cell single cell shown in FIG. 1.

As described above, the fuel cell single cell 1 according to this embodiment is able to improve the drainage performance of the outer-edge channels 110 as parts of flow channels of gas used for power generation, as compared with the known fuel cell. In this connection, the configuration of the fuel cell single cell according to this disclosure is not limited to that of the fuel cell single cell 1 of the above embodiment. Referring now to FIG. 3 and FIG. 4, first and second modified examples of the fuel cell single cell 1 according to the above embodiment will be described.

FIG. 3 is an enlarged view corresponding to FIG. 2, and shows a first modified example of the fuel cell single cell 1 according to the above embodiment.

A fuel cell single cell according to this modified example is different from the fuel cell single cell 1 according to the above embodiment, in that each of the outer-edge channels 110 as gas flow channels that connect the power generating unit 30 with the manifold holes 11 to 14 is independent of adjacent other outer-edge channels 110, over a range from the distal end 111*a* of the distal channel portion 111 communicating with the corresponding manifold hole 11 to 14, to a certain point in the proximal channel portion 112. Since the other points of the fuel cell single cell according to the modified example are substantially identical with those of the fuel cell single cell 1 according to the above embodiment, the same reference numerals are assigned to the same portions or components, which will not be further described.

In the fuel cell single cell according to this modified example, a common channel portion 113 that connects adjacent ones of the proximal channel portions 112 is provided between the distal ends 112*a* of the proximal channel portions 112 connected to the distal channel portions 111, and the proximal ends 112*b* of the proximal channel portions 112 communicating with the power generating unit 30. Thus, in the fuel cell single cell according to this modified example, at least two adjacent gas flow channels, namely, the outer-edge channels 110, are connected to each other via the common channel portion 113 in the proximal channel portions 112. The common channel portion 113 does not traverse all of the outer-edge channels 110, but is cut off at a plurality of locations, in a direction that traverses or crosses the outer-edge channels 110.

With this arrangement, too, a pressure difference of the fuel gas between the distal end 110*a* and proximal end 110*b* of each outer-edge channel 110 can be made larger that of the fuel gas between the upstream end and downstream end of each introduction flow channel in the power generation cell of the known fuel cell. Accordingly, like the fuel cell single cell of the above embodiment, the fuel cell single cell of this modified example is also able to improve the drainage performance of the outer-edge channels 110 as parts of flow channels of gas used for power generation, as compared with that of the known fuel cell.

FIG. 4 is an enlarged view corresponding to FIG. 2, and shows a second modified example of the fuel cell single cell 1 according to the above embodiment.

The fuel cell single cell according to this modified example is different from the fuel cell single cell 1 according to the above embodiment, in that each of the proximal channel portions 112 of the outer-edge channels 110 as gas flow channels that connect the power generating unit 30 with the manifold holes 11 to 14 does not have the first proximal channel portion 112*d* and the second proximal channel portion 112*e*. Since the other points of the fuel cell single cell according to the modified example are substantially identical with those of the fuel cell single cell 1 according to the above embodiment, the same reference numerals are assigned to the same portions or components, which will not be further described.

With this arrangement, too, a pressure difference of the fuel gas between the distal end 110*a* and proximal end 110*b* of each outer-edge channel 110 can be made larger that of the fuel gas between the upstream end and downstream end of each introduction flow channel in the power generation cell of the known fuel cell. Accordingly, like the fuel cell single cell of the above embodiment, the fuel cell single cell of this modified example is also able to improve the drainage performance of the outer-edge channels 110 as parts of flow channels of gas used for power generation, as compared with that of the known fuel cell.

While one embodiment of the fuel cell single cell according to the disclosure has been described in detail using the drawings, the specific configuration of the fuel cell single cell is not limited to that of this embodiment, but other embodiments including design changes, etc. without departing from the principle of this disclosure may also be included in this disclosure.

What is claimed is:

1. A fuel cell single cell comprising:
a pair of separators each having manifold holes:
a frame disposed between the separators;
a power generating unit disposed in an opening of the frame; and
a plurality of gas flow channels configured to connect the power generating unit with the manifold holes,
wherein the separators, the frame and the power generating unit are stacked in a stacking direction;
wherein each of the gas flow channels has a distal channel portion defined by a frame groove provided in the frame and configured to communicate with the manifold holes, and a proximal channel portion defined by a separator groove provided in a corresponding one of the separators and configured to communicate with the power generating unit, each of the gas flow channels being configured to be independent of adjacent other gas flow channels, at least over a range from a distal end of the distal channel portion, which communicates with the manifold holes, to a point in the proximal channel portion;
wherein the proximal channel portion includes a connecting portion connected to the distal channel portion, the connecting portion overlaps the proximal end of the distal channel portion in the stacking direction;
the connecting portion of the proximal channel portion is a flow channel that is curved in an arc, a curvature circle of the outer peripheral edge of the connecting portion has a diameter that is larger than the width of the proximal end of the distal channel portion;
the proximal channel portion includes a first proximal channel portion connected to one end of the connecting portion and configured to extend toward the power generating unit, and a second proximal channel portion connected to an other end of the connecting portion and configured to extend toward the power generating unit.

2. The fuel cell single cell according to claim 1, wherein each of the gas flow channels is configured to be independent, over a range from a distal end of the gas flow channel which communicates with the manifold holes, to a proximal end of the gas flow channel which communicates with the power generating unit.

3. The fuel cell single cell according to claim 1, wherein at least two adjacent ones of the gas flow channels are configured to be connected via a common channel portion in the proximal channel portion.

* * * * *